United States Patent [19]

Pittella

[11] Patent Number: 5,358,206

[45] Date of Patent: * Oct. 25, 1994

[54] BRACKET FOR CANTILEVER MOUNTING OF FLAT SHELF PLATES

[76] Inventor: Joseph A. Pittella, 42 Riviera Dr., San Remo, N.Y. 11754

[ * ] Notice: The portion of the term of this patent subsequent to Dec. 21, 2010 has been disclaimed.

[21] Appl. No.: 118,020

[22] Filed: Sep. 8, 1993

Related U.S. Application Data

[63] Continuation of Ser. No. 929,407, Aug. 11, 1992, Pat. No. 5,271,591.

[51] Int. Cl.5 ............................................. A47G 29/02
[52] U.S. Cl. ................................. 248/250; 24/136 L; 174/152 G
[58] Field of Search ............... 248/235, 239, 241, 246, 248/250, 298, 313, 316.3; 108/152

[56] References Cited

U.S. PATENT DOCUMENTS

| | | |
|---|---|---|
| 4,691,887 | 9/1987 | Bessinger ............................ 248/250 |
| 4,733,843 | 3/1988 | Bessinger ............................ 248/250 |
| 4,736,719 | 4/1988 | Bessinger ............................ 248/250 |
| 4,738,426 | 4/1988 | Bessinger ............................ 248/250 |
| 4,856,746 | 8/1989 | Wrobel et al. .................. 248/239 X |
| 5,271,591 | 12/1993 | Pittella ............................. 248/250 |

Primary Examiner—Ramon O. Ramirez
Attorney, Agent, or Firm—Darby & Darby

[57] ABSTRACT

A bracket for cantilever mounting of flat shelf plates has a vertical member with upper and lower spaced projections. A pressure housing is mounted on the underside of the upper projection, and a pressure plate is movably mounted in such underside. Pressure is applied to the pressure plate by a ball bearing mounted in the pressure housing for up and down movement. A set screw is mounted in the pressure housing and positioned to apply downward pressure on the ball bearing and on the pressure plate, whereby a flat shelf member may be inserted between the upper and lower projections and locked in place with the set screw to provide cantilever support at one end of the shelf member.

5 Claims, 1 Drawing Sheet

BRACKET FOR CANTILEVER MOUNTING OF FLAT SHELF PLATES

This application is a continuation of application Ser. No. 07/929,407, filed Aug. 11, 1992, now U.S. Pat. No. 5,271,591.

TECHNICAL FIELD

This invention relates to cantilever mounting of shelf plates and more particularly to a wall mounted bracket for providing cantilever mounting of shelves.

BACKGROUND

In conventional shelves, for instance, in bookcases, the shelves are supported at each end with vertical support members so that the assembly must be manufactured, transported and installed, which is difficult and expensive because these assemblies are generally heavy and bulky.

THE INVENTION

The present invention eliminates the need for supports for shelf members, for instance, in bookcases, and provides a wall support, bracket which supports the shelving in the cantilever fashion.

This minimizes the number of vertical support members required and provides a means to build decorative spacious shelf assemblies quickly on the site of use. This eliminates the manufacture, transportation and installation of bulky and heavy assemblies.

OBJECTS OF THE INVENTION

A principal object of the invention is to provide a new and improved bracket for mounting shelves either singly or in bookcase style.

Another object of the invention is to provide means for constructing shelves such as bookcases on the site of use so that the parts can be easily transported and installed, thereby eliminating the manufacture, transporting and installing of bulky and heavy assemblies.

Another object of the invention is to provide a new bracket for cantilever mounting of flat shelf plates comprising: a vertical member, upper and lower spaced projections on the vertical member, a pressure housing on the underside of the upper projection, a pressure plate movably mounted in the underside of the upper projection, and means to apply pressure to the pressure plate comprising a ball bearing mounted in the pressure housing for up and down movement in contact with the pressure plate, and a set screw mounted in the pressure housing and positioned to apply downward pressure on the ball bearing and on the pressure plate, whereby a flat shelf member may be inserted between the upper and lower projections and locked in place with the set screw, to provide cantilever support at one end of the shelf member.

These and other objects of the invention will be apparent from the following specification and drawings.

BEST MODE OF THE INVENTION

Figure 2:
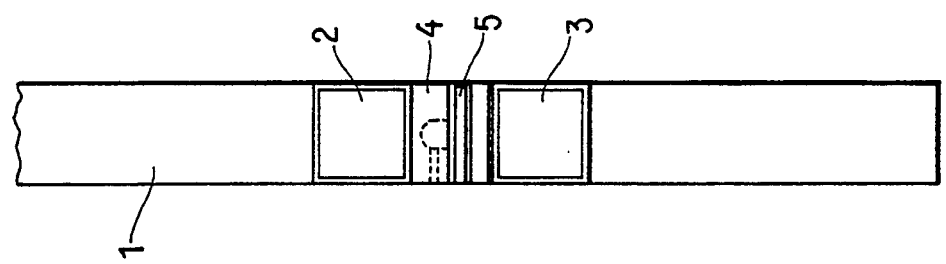
FIG. 2 is a front view of FIG. 1.
Figure 1:
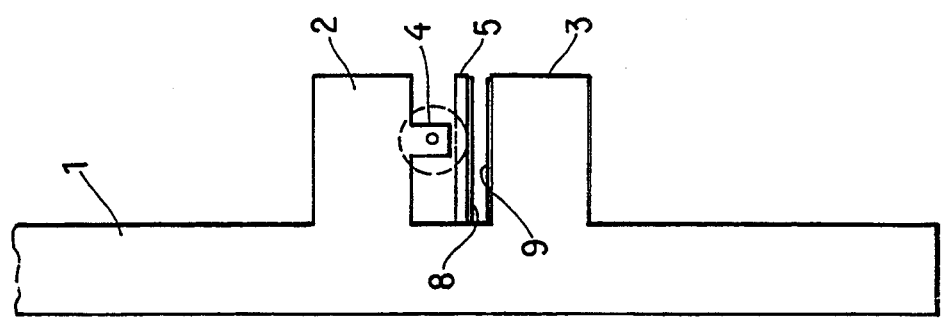
FIG. 1 is a side view of an embodiment of the invention.

Referring to the Figures, FIG. 1 shows a side view and FIG. 2 a front view of a first embodiment of the invention comprising a vertical member 1, and upper and lower spaced projections 2, 3. A pressure plate housing 4 is mounted on the underside of the upper projection 2. The pressure housing includes a pressure plate 5 which is movably mounted in the pressure housing 4.

Pressure is applied to the pressure plate 5 by a ball bearing 6 which is mounted in a recess in the pressure plate housing 4. A set screw 7 is mounted in the housing 4 so as to exert downward pressure on the ball bearing 6 and the pressure plate 5. A rubber pad 8 is mounted on the underside of the pressure plate 5. The lower projection 3 also has a friction plate 9, for instance, of rubber. The shelf member to be mounted, not shown, is inserted between the upper and lower projections intermediate the rubber pads 8 and 9. The set screw is then tightened to clamp the shelf member in cantilever fashion.

The vertical member 1 may be constructed with a number of upper and lower projection pairs, for instance, if it is desired to mount a series of shelves as in a bookcase.

Figure 6:
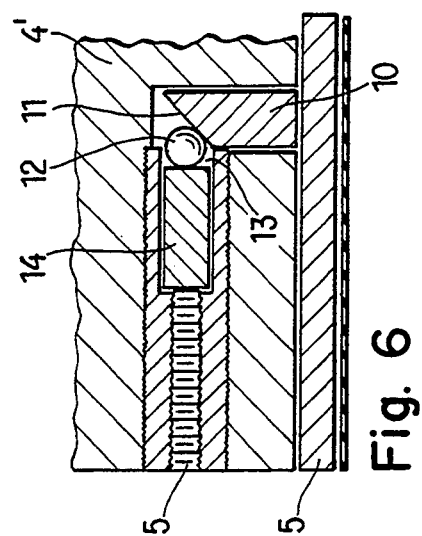
FIG. 6 is an enlarged detail sectional view of a modification of the invention.
Figure 3:
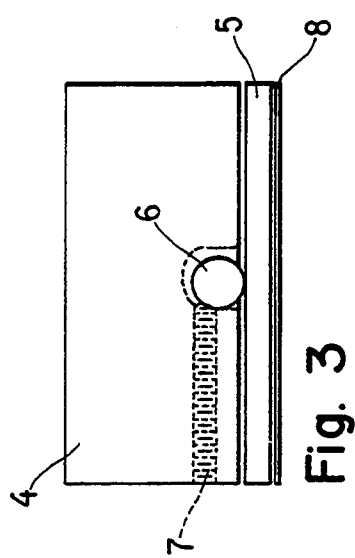
FIG. 3 is an enlarged side view of the pressure housing assembly of FIG. 1.
Figure 4:
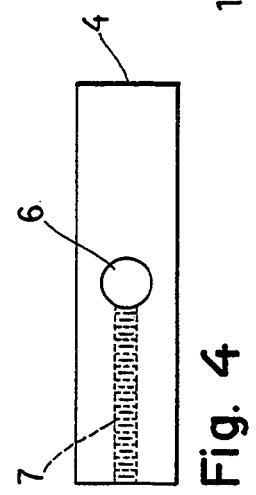
FIG. 4 is a bottom view of FIG. 3.
Figure 5:
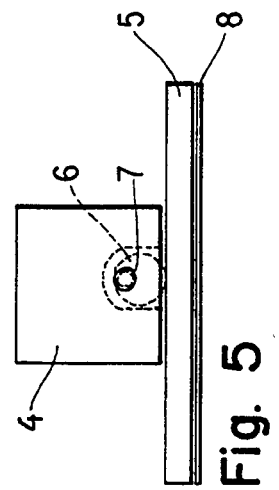
FIG. 5 is a front view of FIG. 3.

FIG. 6 shows an enlarged detail view of a modification of the invention. In this modification, a rod-shaped or bar-shaped pressure pin 10 is mounted in the housing 4'. The pressure pin 10 has an inclined upper surface 11, and ball bearing 12 is mounted in the recess 13. Pressure is applied to the ball bearing 12 by rod-shaped or bar-shaped pin 14 which is actuated by set screw 15. The invention can mount cabinets, racks, and other items.

It is claimed:

1. Bracket for mounting articles such as shelves, racks and cabinets, comprising first and second projections; and means for clamping part of an article between said projections, said clamping means including a substantially flat plate discrete from said projections and receivable between the same for movement in a direction from one of said projections towards the other of said projections, and means for moving said plate in said direction, said other projection and said plate being designed to be at least approximately coextensive, and said other projection having a substantially flat clamping surface portion which is arranged to confront, and is designed to be at least approximately coextensive with, said plate.

2. The bracket of claim 1, wherein said moving means is mounted on said one projection.

3. The bracket of claim 1, further comprising a strip-like support for said projections.

4. The bracket of claim 3, wherein said plate, said projections and said support are designed to be substantially flush laterally.

5. The bracket of claim 1, wherein said one projection is designed to be at least approximately coextensive with said other projection and said plate.

* * * * *